March 28, 1961 HANS-JOACHIM KLEINSCHMIDT 2,976,704
SHEARING COUPLING, ESPECIALLY FOR UNIVERSAL JOINT SHAFTS
Filed Jan. 18, 1960 2 Sheets-Sheet 1

United States Patent Office 2,976,704
Patented Mar. 28, 1961

2,976,704

SHEARING COUPLING, ESPECIALLY FOR UNIVERSAL JOINT SHAFTS

Hans-Joachim Kleinschmidt, Essen, Germany, assignor to Gelenkwellenbau G.m.b.H., Essen, Germany Filed Jan. 18, 1960, Ser. No. 2,893

Claims priority, application Germany Jan. 17, 1959

2 Claims. (Cl. 64—28)

The present invention relates to a shearing coupling, especially for universal joint shafts used for instance for heavy duty drives for example in rolling mills. Couplings of this general type are employed in order that at undue overloads the drive will immediately be interrupted to save the shafts and the transmission against breakage. Such undue overloads may be caused for instance by heavy shocks and inherent stresses due to blocking of automatic disengaging clutches or the like.

It is an object of the present invention to provide a simplified and improved shearing coupling which will be relatively inexpensive in construction and will be highly reliable.

It is another object of this invention to provide a shearing coupling, as set forth in the preceding paragraph, which will make it possible after destruction of a bore through which the respective shearing bolt is passed, still further to employ the shearing coupling.

These and other objects and advantages of the invention will appear more clearly from the following specification in connection with the accompanying drawings, in which.

The shearing coupling according to the present invention is characterized primarily by a double flanged coupling member journalled on a supporting shaft or supporting stud by means of radial and thrust bearings in such a way that between that flange of said double flanged coupling member which receives the shearing pins on one hand, and the flange of the universal joint shaft on the other hand, there will remain a slight distance, preferably from approximately 0.5 to 1 millimeter. This has the great advantage that, if the shearing pins break, the two adjacent flanges of the two flanged coupling member and said universal joint shaft respectively will be able freely to rotate relative to each other without engaging each other.

According to an embodiment which has been proved particularly advantageous in practice, the thrust bearings may be arranged between shoulders of the double flanged coupling member and a collar of the supporting shaft or stud and a disc connected thereto for instance by bolts. Furthermore, the double flanged coupling member may be journalled on said supporting stud or shaft by means of two radial bearings and a thrust bearing.

Figure 1:
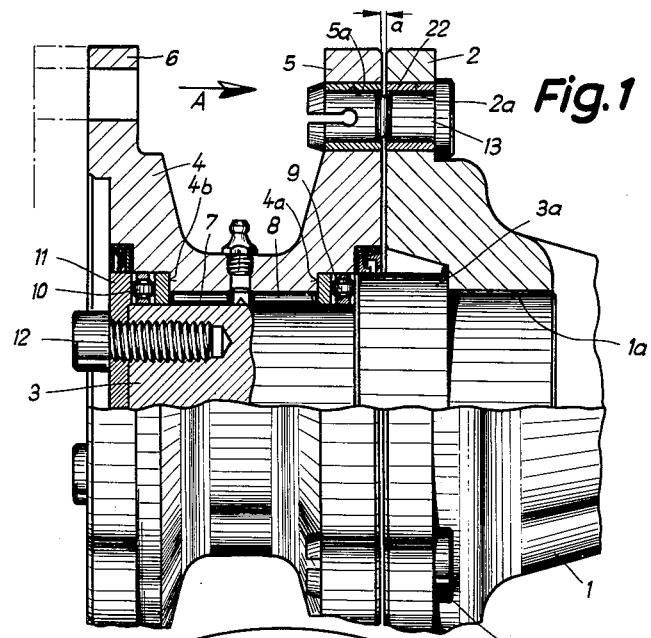
Fig. 1 is a side view, partly in section, of a shearing coupling according to the invention.
Figure 2:
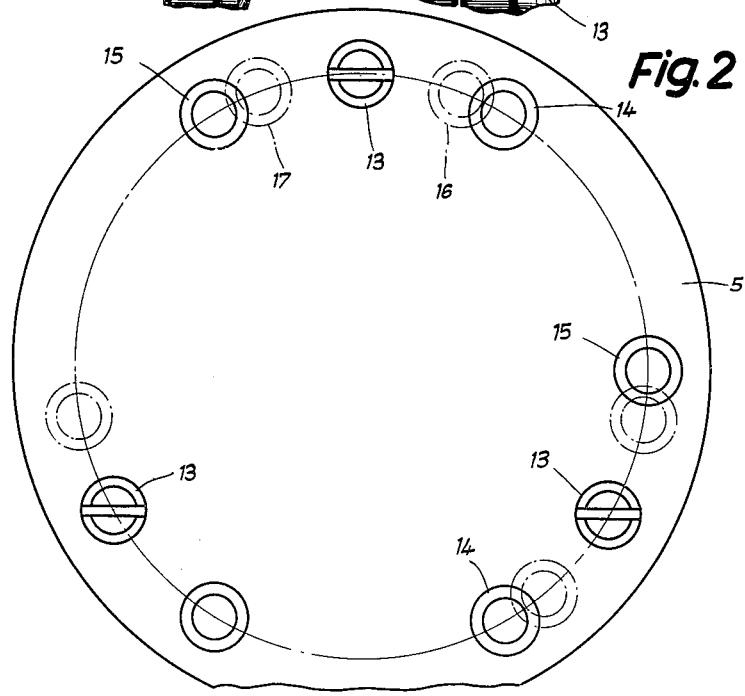
Fig. 2 is an end view of the shearing coupling of Fig. 1 as seen in the direction of the arrow A.

Referring now to the drawings in detail and Figs. 1 and 2 thereof in particular, the construction shown therein comprises a universal joint shaft 1 provided with a flange 2. Universal joint shaft 1 has a bore 1a in which is arranged a supporting shaft or stud 3 for journalling and supporting a double flanged coupling member 4. This coupling member is equipped with two flanges 5 and 6 spaced from each other in axial direction of said coupling member 4.

For journalling the coupling member 4 in radial direction, there are provided two needle bearings 7 and 8 the needles of which are adapted to roll on the supporting shaft 3. Supporting shaft 3 is provided with a collar 3a, whereas the double flanged coupling member 4 is provided with a shoulder 4a. A thrust bearing 9 is arranged between said collar 3a and said shoulder 4a. Similarly, a second thrust bearing 10 is arranged between a shoulder 4b of the coupling member 4 and a disc 11 which latter is connected to the end face of supporting shaft 3 in any convenient manner for instance by bolts 12.

As will be evident from Fig. 1, flange 2 of shaft 1 and flange 5 of the double flanged coupling member 4 are provided with bores for receiving shearing pins 13 which will break if the torque to be transmitted through shaft 1 and coupling member 4 exceeds a predetermined value.

The double flanged coupling member 4 is journalled in such a manner that between the flanges 2 and 5 there will remain a slight distance $a$, preferably of the magnitude of from 0.5 to 1 millimeter. It will be appreciated that in this way, when the shearing pins break, the two flanges 2 and 5 are able to rotate relative to each other without engaging each other.

In order to be able, in case one or more of the bores 2a, 5a or the bushings 22 receiving the shearing pins 13 should be damaged or destroyed, further to use the coupling arrangement according to the invention, flange 5 and flange 2 may be provided with additional bores. Thus, as indicated in Fig. 2 flange 5 in addition to comprising the bores shown engaged by the shearing pins 13 also comprises additional bores 14 and 15, whereas the flange 2 in addition to comprising the bores through which pins 13 extend also comprises additional bores 16 and 17. It will thus be evident that when the shearing pins 13 break, new bores can be used for the new shearing pins. The relative angular arrangement of the bores in flange 2 and of the bores in flange 5 is such that at no times more bores can be provided with shearing pins than are provided for the coupling.

Figure 3:
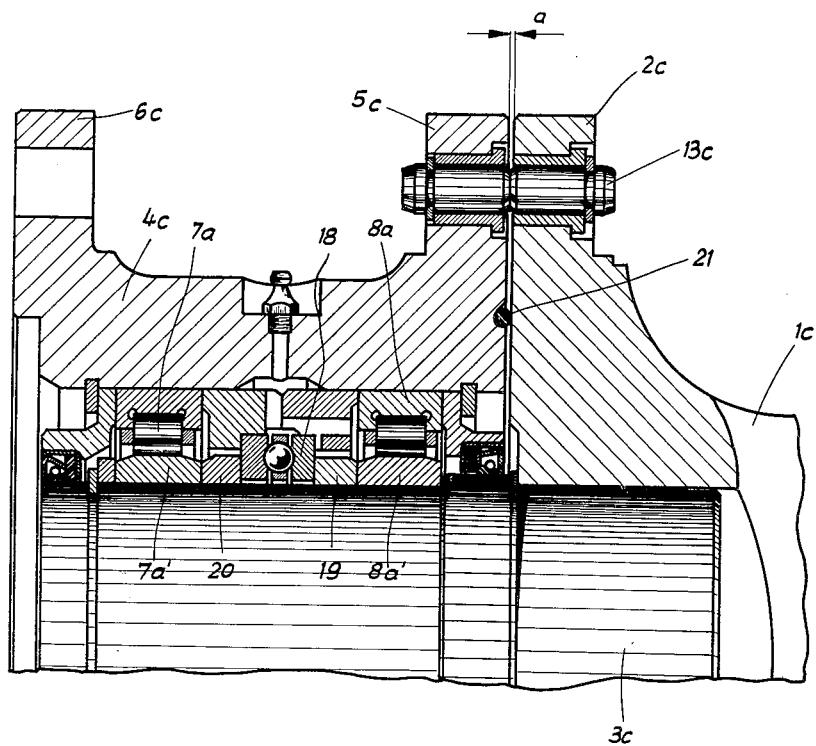
Fig. 3 is a longitudinal section through a portion of a modified shearing coupling according to the invention.

Referring now to the embodiment shown in Fig. 3, this embodiment differs from that of Fig. 1 primarily in that two self-aligning bearings 7a and 8a are provided for radially journalling the double flanged member 4c. The inner races 7a' and 8a' of said bearings 7a and 8a are mounted on and connected to a supporting shaft or stud 3c in the universal joint shaft 1c. Between said two inner races 7a' and 8a' there is arranged a thrust bearing 18, while spacer rings 19 and 20 are provided between said inner races 7a' and 8a' and said thrust bearing 18.

All other parts in the embodiment of Fig. 3 substantially correspond to similar parts of Fig. 1 and therefore have been designated with the same reference numerals as in Fig. 1 but with the additional letter c.

In the gap between flange 5c and double edged flange 4c and the flange 2c of the universal joint shaft 1c there may be provided a sealing ring 21 for preventing dust or other impurities from entering into the structure. Of course, if desired, a similar sealing ring may also be provided in the arrangement of Fig. 1.

It is, of course, to be understood that the present invention is, by no means, limited to the particular construction shown in the drawings but also comprises any modifications within the scope of the appended claims.

What I claim is:

1. In combination: a universal joint shaft having a flange provided with a plurality of bores therethrough, a supporting shaft supported by said universal joint shaft and extending in substantially axial alignment therewith beyond the flange of said universal joint shaft, that portion of said supporting shaft which extends beyond the flange of said universal joint shaft being provided with a collar, a coupling member rotatably journalled on said supporting shaft and provided with a first flange having bores therethrough corresponding to and adapted to be axially aligned with the bores of the flange of said universal joint shaft, said coupling member comprising axially spaced shoulders near said supporting shaft and also comprising a second flange spaced from said first flange for connection with a structural element to be drivingly connected by said coupling member to said universal joint shaft, disc means connected to that end face of said supporting shaft which is remote from the flange of said universal joint shaft, thrust bearing means mounted on said supporting shaft between the shoulders of said coupling member and said collar and said disc means, thrust bearing means between said shoulders and mounted on said supporting shaft, said thrust bearing means maintaining said first flange in slightly spaced relationship to the flange of said universal joint shaft, and shearing pins extending at least through some of said bores in said first flange and the flange of said universal joint shaft.

2. In combination: a universal joint shaft having a flange provided with a plurality of bores therethrough, a supporting shaft supported by said universal joint shaft and extending in substantially axial alignment therewith beyond the flange of said universal joint shaft, a coupling member rotatably journalled on said supporting shaft and provided with a first flange having bores therethrough corresponding to and adapted to be axially aligned with the bores of the flange of said universal joint shaft, said coupling member also comprising a second flange spaced from said first flange for connection with a structural element to be drivingly connected by said coupling member to said universal joint shaft, a plurality of axially spaced radial bearings interposed between said supporting shaft and said coupling member for rotatably journalling the latter on said supporting shaft, thrust bearing means likewise interposed between said coupling member and said supporting shaft and arranged intermediate said radial bearings, said radial and axial bearings maintaining said first flange slightly spaced from the flange of said universal joint shaft, and shearing pins extending through at least some of said bores in the flange of said universal joint shaft and in said first flange for rotatably connecting the latter to said universal joint shaft.

References Cited in the file of this patent

UNITED STATES PATENTS

| | | |
|---|---|---|
| 1,439,380 | Ryding et al. | Dec. 19, 1922 |
| 2,307,556 | Wileman | Jan. 5, 1943 |
| 2,438,676 | Nickle et al. | Mar. 30, 1948 |